(12) United States Patent  
Joskin et al.

(10) Patent No.: US 7,425,982 B2
(45) Date of Patent: Sep. 16, 2008

(54) METHOD AND APPARATUS FOR RESAMPLING LINE SCAN DATA

(75) Inventors: Yves R. Joskin, Esneux (BE); Firmin J. Louis, Woluwé-Saint-Lambert (BE)

(73) Assignee: Euresys SA (BG)

( * ) Notice: Subject to any disclaimer, the term of this patent is extended or adjusted under 35 U.S.C. 154(b) by 910 days.

(21) Appl. No.: 10/712,428

(22) Filed: Nov. 12, 2003

(65) Prior Publication Data

US 2006/0232702 A1    Oct. 19, 2006

(51) Int. Cl.
*H04N 9/47*    (2006.01)
*H04N 1/04*    (2006.01)

(52) U.S. Cl. .................... 348/142; 348/206; 348/125; 358/486

(58) Field of Classification Search .................. 348/88, 348/92, 125, 142, 206; 382/141; 358/486, 358/496
See application file for complete search history.

(56) References Cited

U.S. PATENT DOCUMENTS 4,170,419 A * 10/1979 Van Tyne et al. ............ 356/431
4,591,727 A * 5/1986 Gaebelein et al. ........... 358/496
5,608,538 A * 3/1997 Edgar et al. ................. 358/406

* cited by examiner

*Primary Examiner*—Gims S. Philippe
*Assistant Examiner*—Erick Rekstad
(74) *Attorney, Agent, or Firm*—Dov Rosenfeld; Inventek

(57) ABSTRACT

A method and an apparatus to accept line-scan data sets at a camera rate from a line-scan camera and resample the line-scan data sets to produce resampled line image data sets at a desired sampling distance. Each line-scan data set is of an object imaged for a fixed exposure time and moving at a relative speed in relation to the line-scan camera. The method includes accepting the line-scan data sets at the camera rate from the line-scan camera, accepting a measure of the relative speed between the line-scan camera and the object being imaged by the line-scan camera, and resampling the line-scan data sets to produce resampled line image data sets at the desired sampling distance. The resampling is a function of the camera rate, the measure of relative speed and the desired sampling distance. The resampling adjusts for the variations in relative speed to produce faithfully exposed data.

4 Claims, 7 Drawing Sheets

METHOD AND APPARATUS FOR RESAMPLING LINE SCAN DATA

BACKGROUND

The present invention relates to industrial vision systems using one-dimensional image detectors also known as line scan cameras, and specifically relates to a method and apparatus for imaging using a line scan camera and building a two dimensional image from the data obtained using the line scan camera.

It is known to obtain a two-dimensional image from a line scan camera by providing relative motion between the camera and the object to be imaged. This, for example, is the way such scanners as used in fax machines and photocopiers commonly operate. The object to be imaged is illuminated, e.g., with light, or with an x-ray source, or other source of radiating energy. The collection of lines captured during the relative motion can be used to build a two-dimensional image. Such an arrangement is common, for example, in industrial vision, in which the line-scan camera is stationary, and the article to be imaged moves is in the form of a moving web, or on a moving belt. The arrangement is particularly useful and common for inspecting a continuous ribbon of material such as paper, glass, material, or plastic. Inspecting such a material is known as "web inspection."

Industrial vision also uses line-scan cameras when very high resolution is needed. Today (2003), it is cheaper to use a 5000-element line-scan camera and a mechanical fixture to provide relative motion, than using a 5000 by 5000 area-scan camera. Such large area image detectors are still relatively expensive.

Constant speed of relative motions and a constant rate at which lines of image data are obtained—called the camera rate herein—lead to an image that is uniformly sampled in each of the two dimensions. The spatial sampling period need not be the same in the two dimensions. Furthermore, when both the speed of relative motion and the camera rate are constant, constant exposure leads to an evenly exposed two-dimensional image.

If the speed of relative motion is not constant, the gap between successive scanned lines is not constant. Such speed variations lead to a geometric distortion unless corrective measures are taken.

Many industrial applications cannot achieve a constant speed of relative motion between the camera and object to be imaged. Large high-speed industrial document scanners, for example, require relatively long acceleration and deceleration phases, but are required to correctly scan sheets of paper at any time.

The present invention is related to dealing with such non-uniform speed variations.

One prior art method of dealing with the speed variation is to control the camera rate according to the speed of relative motion. When the relative motion is slower, the camera rate is also decreased to maintain a constant distance between scan lines. Similarly, when the relative motion is faster, the camera rate is proportionally increased.

A common way of achieving a camera rate proportional to the speed is to use a motion encoder, typically an electromechanical device that provides a pulse train of a rate proportional to speed of linear motion in the case of a linear encoder, or a pulse train of a rate proportional to the revolution rate in the case of a rotary encoder. By the encoder rate we mean the pulse frequency proportional to the speed of relative motion. By the encoder pitch we mean the distance traveled in relative motion between the camera and object to be imaged between consecutive pulses. Note that using an encoder is not the only way to obtain a repeating pulse of a frequency proportional to the speed of relative motion. Another way is by using a stepping motor to move the web, and thus provide the relative motion. Such a stepping motor is driven by a pulse train, such that each consecutive pulse leads to a motion of a known amount, e.g., a known rotation of the motor corresponding to a known relative displacement between the camera and object to be imaged. The term encoder pitch is equally applicable to this and other mechanisms of providing a signal of a frequency proportional to the relative motion.

Thus, one prior art method of accommodating speed variations is to link the camera rate to the encoder rate, e.g., to have the camera rate be a programmable fraction of the encoder rate.

Note that the maximum camera rate a camera can accommodate is determined by the time needed to extract the pixel data out of the camera (the "readout time"). For example, a 2048-pixel camera with a pixel rate of 20 MHz requires 102.4 µs to read out, assuming no additional time overhead. This sets the maximum camera rate at 9.7 kHz. In practice, there is also an unavoidable time overhead, leading to slightly lower maximum camera rate.

Another aspect of using line scan (and other) cameras is exposure. A typical line scan camera has no exposure control. We call such a camera a permanent exposure camera. With such a camera, the time the image is collected is determined by the camera rate. Thus, with uniform illumination, video lines that are scanned at low speed are exposed for longer and are thus brighter than those exposed at low speed. This produces an undesirable variation in amplitude.

Some line scan cameras include an electronic shutter that controls the exposure time. Such cameras are called controlled exposure cameras. These are also sometimes called integration control and shutter control cameras. Typically, with such cameras, the pulse width of an exposure input signal sets the shutter time. The variations of amplitude may be controlled by fixing the time the cameras shutter is open so long as the shutter time is less than the period corresponding to the camera rate.

Thus, one prior art solution to dealing with variable web speed is to use a mechanism such as an encoder or stepping motor that provides an encoder rate proportional to the speed of the web to accommodate speed variations, and to use a controlled exposure camera to ensure uniform exposure.

FIG. 1 shows such a prior-art controlled exposure system. A stationary line-scan camera includes a line trigger input that triggers an exposure and an exposure input that is a periodic pulse at the camera rate with a pulse width that sets the exposure time. The moving web includes an encoder that generates pulses at a rate proportional to the speed of the web. A rate converter controllable by a resolution control module of a controller outputs the line trigger signal at the camera rate proportional to the web speed rate. The exposure input accepts a pulse of a controllable length from a one-shot pulse generator controlled by an exposure control unit. The one-shot pulse generator is triggered by a camera rate input from the rate converter. The outputs from the camera are line-scan data sets accepted by a camera data conditioner and stored in an image storage memory.

It turns out that having exposure control somehow degrades the quality of the output video signal (the line-scan data sets). This may be because there is a rather aggressive charge dumping inside the sensor with exposure control. Whatever the reason, it is widely recognized that this occurs. In the camera community, it is said the exposure control increases what is called the fixed noise pattern.

Furthermore, there recently have been introduced some relatively high-resolution relatively high rate line-scan camera that do not provide for exposure control.

Furthermore, with exposure control, there is a maximum rate beyond which the camera cannot operate, e.g., as determined by the readout time. In the case of the camera rate being proportional to the encoder rate, if the encoder rate exceeds some fixed limit, the camera may signal an exception condition and scanning typically is stopped. More typically, the camera provides no "exception condition signal" but "looses" the overriding trigger pulses. The output is not reliable in such a case.

Furthermore, with exposure control, a substantial amount of the image information may be lost, for example, when the shutter is closed. Thus, for example, when the web is moving relatively slowly, the lines from which a two-dimensional (2-D) image needs to be constructed are further apart. There is therefore a spatial distortion that varies with the relative speed. Furthermore, less of the illumination is collected from those parts of the imaged object that are in between the collected image lines, limiting the signal-to-noise ratio (SNR).

The alternative to exposure control is a free-running camera that generates a line scan at some fixed relatively high camera rate. The rate may be provided by the camera using an internal clock in the camera. Such a camera rate is related to the maximum pixel rate of the line scan detector. Alternately, an external clock may be used to operate the camera without exposure control.

As described above, there are advantages to having no exposure control. As an example, setting a camera rate lower than a maximum value is a mechanism that provides for increasing the exposure time, thus improving the sensitivity, even when no exposure control is explicitly provided within the camera.

Thus, there is a need for a method and apparatus that uses permanent exposure camera and that accommodates variations in relative speed between a camera and an object to be imaged.

Thus there also is a need for a method and apparatus of imaging using a permanent exposure line-scan camera with the camera cycling freely so that imaging occurs a maximum amount of the time.

Thus there also is a need for a method and apparatus of imaging using a permanent exposure line-scan camera with no upper limit to the encoder rate other than that with "too high" an encoder rate, the information may not be processable. Not having such an upper limit provides a margin of safety in the operation, ensuring a reliable use of the maximum rate performance from the camera.

SUMMARY

Described herein are a method and an apparatus to accept line-scan data sets at a camera rate from a line-scan camera and resample the line-scan data sets to produce resampled line image data sets at a desired sampling distance. Each line-scan data set is of an object imaged for a fixed exposure time and moving at a relative speed in relation to the line-scan camera. The method includes accepting the line-scan data sets at the camera rate from the line-scan camera, accepting a measure of the relative speed between the line-scan camera and the object being imaged by the line-scan camera, and resampling the line-scan data sets to produce resampled line image data sets at the desired sampling distance. The resampling is a function of the camera rate, the measure of relative speed and the desired sampling distance. The resampling adjusts for the variations in relative speed to produce faithfully exposed data.

DETAILED DESCRIPTION

Figure 1:
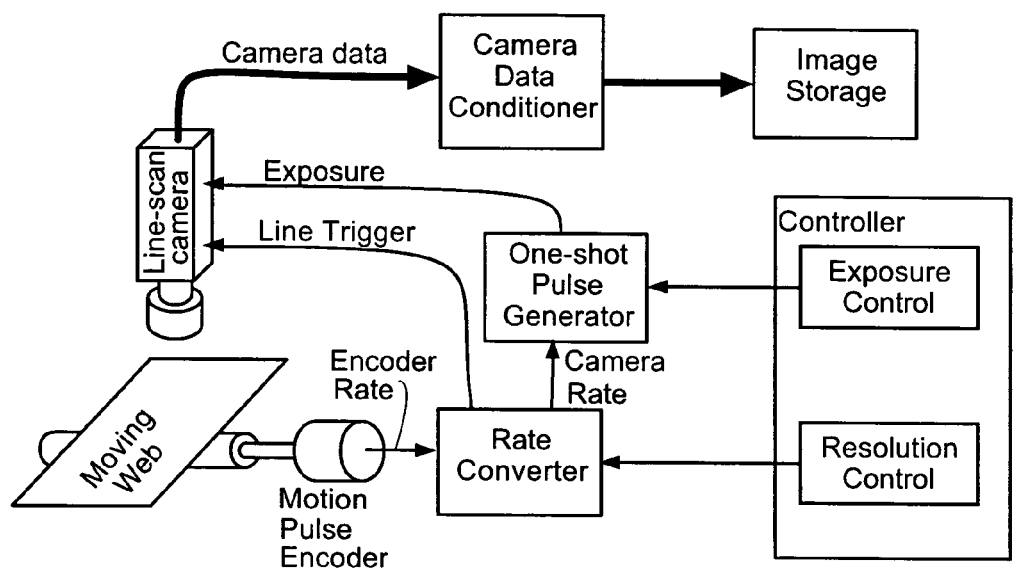
FIG. 1 shows a prior art system that includes exposure control of a line-scan camera.
Figure 2:
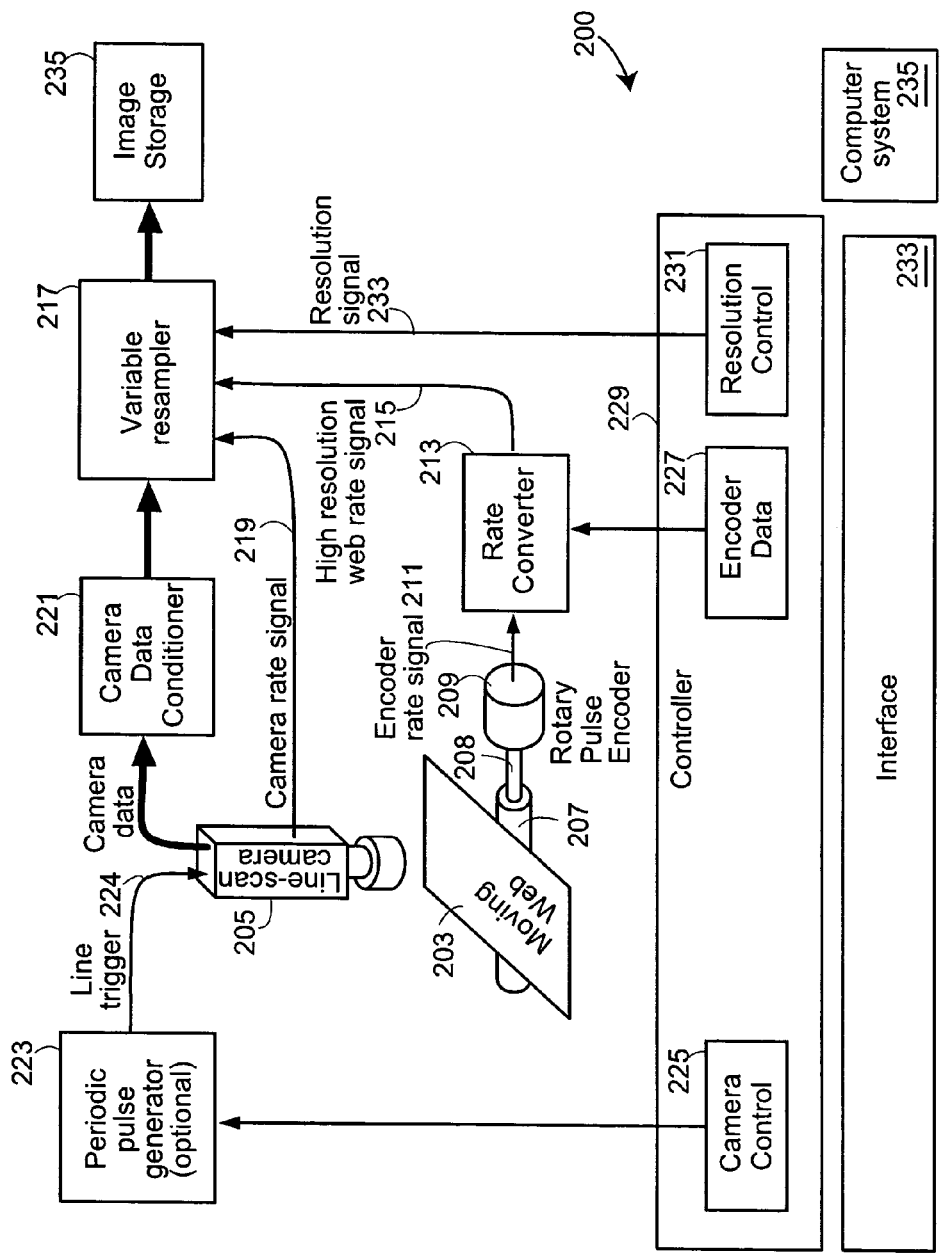
FIG. 2 shows one embodiment of a system that uses a line-scan camera without exposure control for imaging an object and that provides for varying speed of relative motion between the camera and the to-be-imaged object.

FIG. 2 shows one embodiment of a system for operating a camera without exposure control yet providing for variable speed of relative motion between the camera and the object being imaged.

An object to be imaged 203 and a line scan camera 205 are provided. Relative motion is provided between the camera 205 and the object 203 in a direction perpendicular to the imaging line direction of the camera. In one embodiment, the object to be imaged is a moving web or on a moving belt. For simplicity, a moving web refers to either a moving object to be imaged or an object on a moving belt. The camera 205 is oriented to image lines perpendicular to the direction of motion of the web and output line-scan data sets of the imaged lines. The web is driven by a drive system, e.g., a motor (not shown) and a mechanism that includes at least one roller. One such roller is shown as roller 207. A rotary pulse encoder 209 is attached to a shaft 208 on the roller 207. The rotary pulse encoder 209 produces a pulse train 211 at the encoder rate proportional to the speed of the web, and thus to the relative speed between the camera 205 and the to-be-imaged object 203.

The system 200 accommodates two modes of operation. In a first mode, the camera 205 is free running at a camera rate according to an internal clock in the camera. In a second mode, the camera operates at a camera rate controlled by a line trigger signal 224. Thus, in the second mode, a line trigger signal 224 is provided by a periodic pulse generator 223 to define the camera rate. The pulse frequency of line trigger signal 224 is controlled by a camera control module 225 of a controller 229.

A line-scan camera operates in a periodic way. This means that the video part of the device outputs line-scan data sets at the camera rate, each line-scan data set representing a line at some known and predictable frequency. We will call this frequency the camera rate.

The encoder rate signal 211 from the encoder 209 is converted by a rate converter 213 to a high-resolution web-rate signal 215 under control of an encoder control module of the converter 213 that provides information about the resolution of the encoder, e.g., in the form of the pitch of the encoder as a number of length units per unit. The high-resolution web-rate signal 215 varies according to the linear speed of the web.

The line-scan data set output of the camera is accepted and appropriately conditioned by a camera data conditioner 221. The conditioned data set is input to a resampler 217 that accepts a camera rate signal 219 from the camera 205. The signal 219 defines the camera rate (whether from an internally generated clock or by the line trigger 224). The resampler 217 further accepts the high-resolution web rate signal 215 that varies according to the web speed, and a resolution signal 233 that defines the desired resolution of the output data in the direction of motion, called the sampling pitch and spatial resampling period herein. The resampler resamples, e.g., interpolates the conditioned image data sets to produce resampled—if necessary, interpolated—line image data sets for storage in an image storage subsystem 235, typically a memory.

To further describe operation of the system 200, the notation shown in Table 1 is used.

TABLE 1

Notation

| Item | Name | Typical unit | Description |
|---|---|---|---|
| Length unit | u | m | Elementary unit used to quantify web-related dimensions. |
| Web speed | $W_S(t)$ | m s$^{-1}$ | Motion speed of the web. Time varying. |
| Web rate | $W_R(t)$ | Hz | Number of length units per second traveled by the moving web. |
| Camera rate | $C_R$ | Hz | Frequency of camera line cycles inspecting the web. |
| Encoder rate | $E_R(t)$ | Hz | Instantaneous frequency delivered by the motion pulse encoder. A time varying quantity. |
| Sampling rate | $S_R(t)$ | Hz | Instantaneous frequency of the resampling process. A time varying quantity. |
| Camera pitch | $C_U(t)$ | a ratio | Number of length units measuring the extension of a camera line. A time varying quantity. |
| Encoder pitch | $E_U$ | a ratio | Number of length units measuring the pitch of the motion pulse encoder. |
| Sampling pitch | $S_U$ | a ratio | Number of length units measuring the pitch of the resampling process. Defines the resolution. |
| Clock frequency | $F_C$ | Hz | Frequency of a stable high frequency reference clock signal. |
| Camera line data | CLD | Array of digital words | Set of digital data issued by the camera after conditioning. This represents the measured luminance profile across the web. |
| Resampled line data | RLD | Array of digital words | Set of digital data reconstructed by the resampler. This represents the required luminance profile across the web. |

The following relationships apply to the above-defined quantities:

$$W_R(t) = \frac{W_S(t)}{u}$$

-continued $$W_R(t) = C_R \times C_U(t)$$
$$W_R(t) = E_R(t) \times E_U$$
$$W_R(t) = S_R(t) \times S_U$$

The Rate Converter

Figure 3:
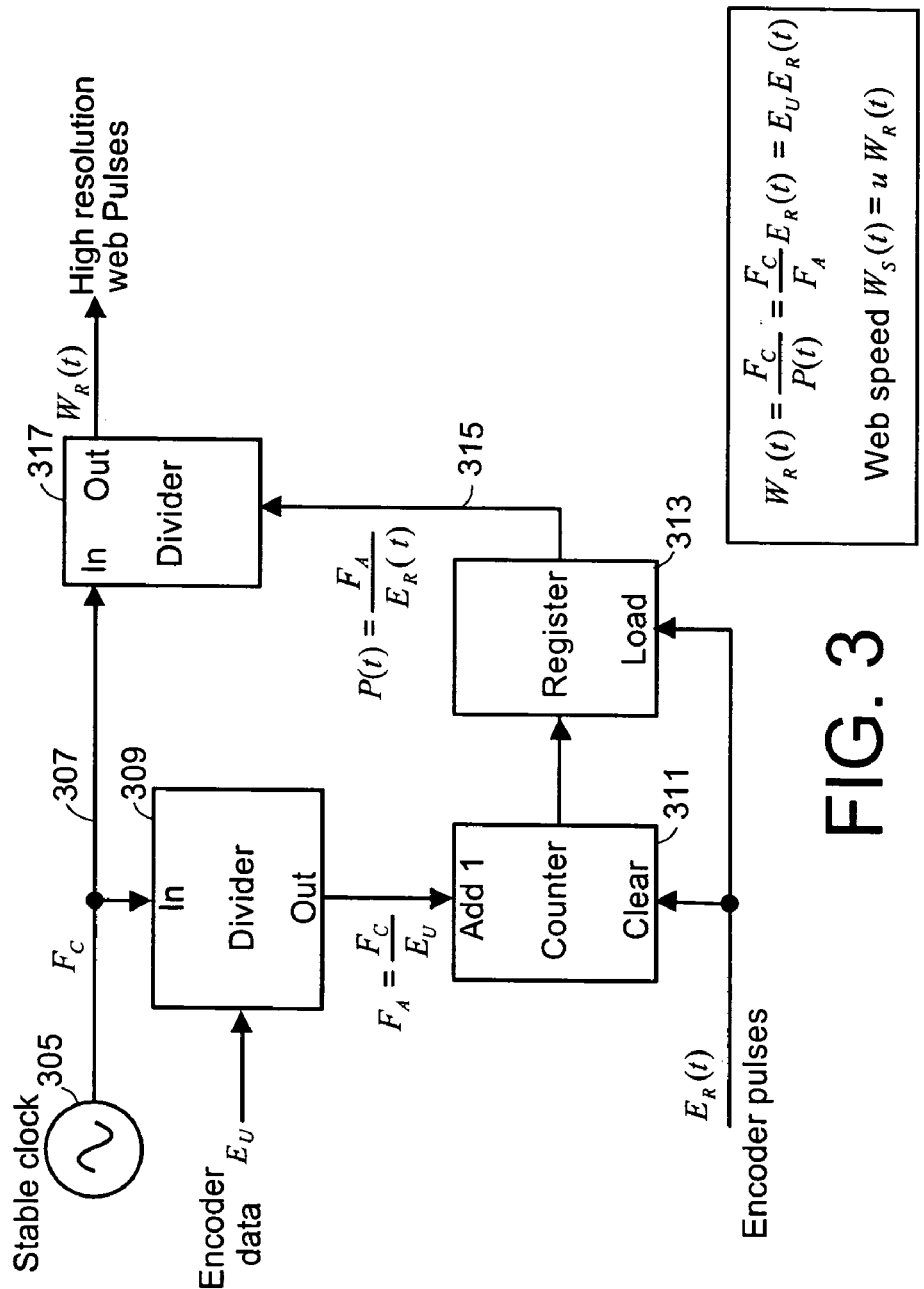
FIG. 3 shows one embodiment of the rate converter of the system shown in FIG. 2.

FIG. 3 shows a simplified block diagram of one implementation of the rate converter 213 that converts a signal 211 at the encoder rate $E_R(t)$ and generates the signal 215 at the high resolution web rate $W_R(t)$ according to an encoder data signal $E_U$ defining the number of length units, e.g., meters in the pitch of the pulse encoder.

In one embodiment, the signal output by the rate converter is a signal at a frequency $W_R(t)$ that varies as the web speed. This signal is proportional to the encoder rate, and is preferably at a frequency significantly higher than the encoder rate, i.e., $W_R(t) >> E_R(t)$.

A clock circuit 305 provides a stable clock signal 307 at a frequency $F_C$. In one embodiment, $F_C$ is 40 MHz. A first programmable divider 309 implemented as a 24-bit accumulator accepts the encoder data $E_U$ that provides the number of length units in between encoder pulses and divides the clock signal 307 by this factor to provide a signal at a frequency $F_A = F_C/E_U$ that is inversely proportional to the distance between encoder pulses. A counter 311—16-bit in one embodiment—and a register 313—also 16-bit in one embodiment—together form a measurement circuit that counts the number of $F_A$ clock periods between successive encoder pulses. The resulting signal 315, denoted P(t), where P(t)=$F_A$/$E_R(t)$, is updated every encoder pulse.

The measured period P(t) is used as a count-down value for a second programmable divider 317 that delivers a pulse train at a rate $W_R(t)$ proportional to the speed of the web, i.e., the speed of relative motion. In particular, $W_R(t) = E_U E_R(t)$.

Note that alternate embodiments that produce a pulse train at a frequency $W_R(t) = E_U E_R(t)$ are possible.

The Resampler

The resampler 217 accepts camera line-scan data sets (denoted CLD) at the camera rate $C_R$ and resamples using interpolation according to the web rate signal (frequency $W_R(t)$) and a signal providing the desired output resolution $S_U$ to generate resampled line image data sets at the desired output resolution (sampling pitch).

Figure 4:
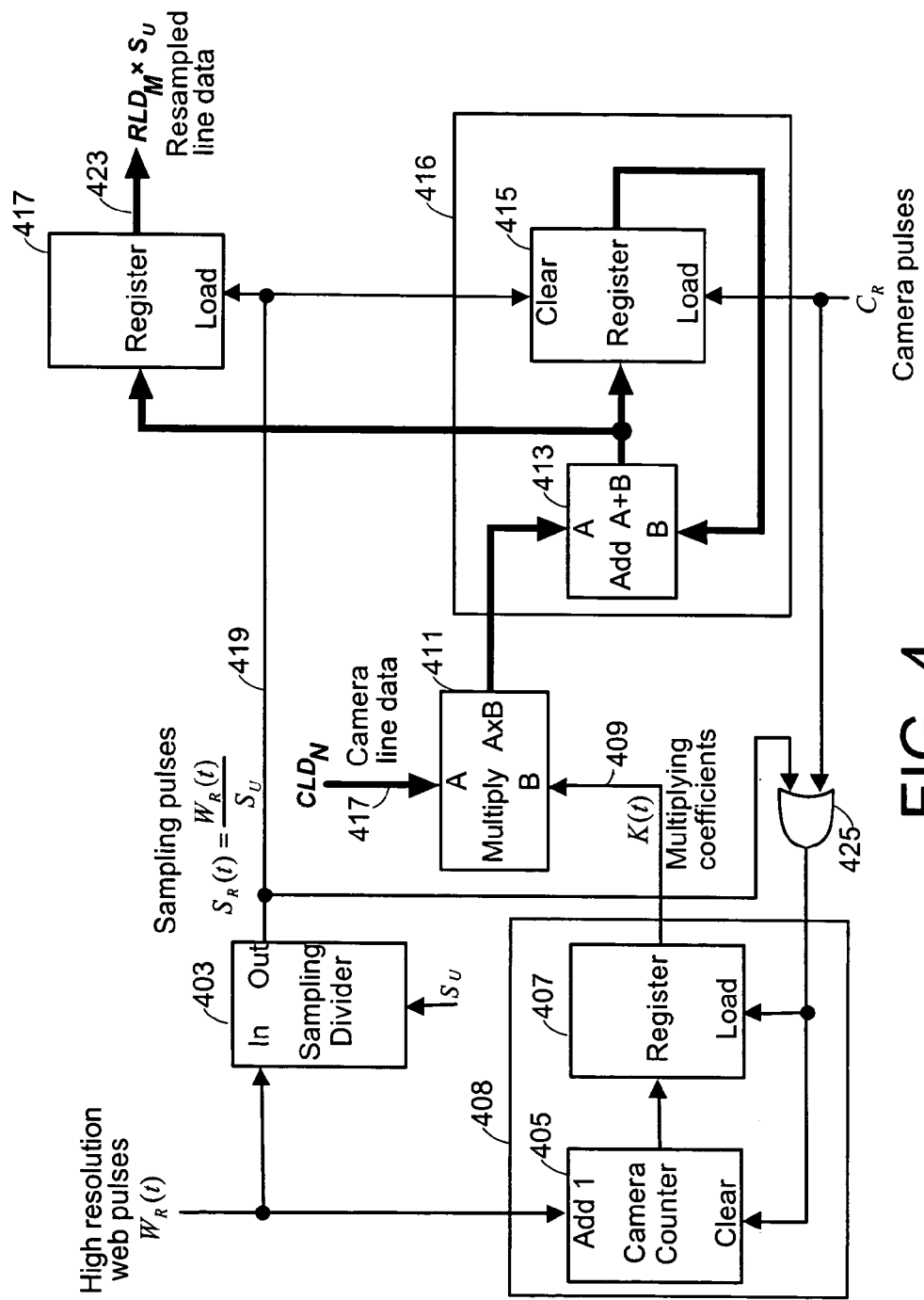
FIG. 4 shows one embodiment of the resampler of FIG. 2.

FIG. 4 shows one embodiment of a resampler 217. The thicker lines are of line data, i.e., vectors of pixel data. The camera line-scan data sets CLD arrive at $C_R$ lines per second, where $C_R$ is the camera rate signal 219 provided by the camera. Denote by CLD$_N$, the luminance of the N'th line-scan data set arrive from the data conditioner 221 and are accepted by the interpolator.

The frequency of the set of web-rate pulses, $W_R(t)$ is divided by the desired resolution $S_U$ in a sampling divider 403 to produce a set of sampling pulses at a rate $S_R(t) = W_R(t)/S_U$. By selecting a small value for the unit of length u, in one embodiment, $S_U$ is number that is a power of 2, and the sampling divider 403 is implemented as a modulo $S_U$ counter. The sampling pulses 419 are such that every time a pulse is issued, a resampled line of image data is loaded into a register set 417 holding a line of pixel data, and a resampled line of pixel data is output from register set 417.

A camera counter 405 together with a register 407 provide a period measuring circuit 408 that measures the period K(t), as a number of rate $W_R(t)$ pulses, between either a sampling pulse or a camera-rate pulse. Thus, when no sampling pulses occur, the period measuring circuit 408 is driven by the camera pulses at the camera rate $C_R$ through an OR gate 425 and measures the camera pitch $C_U(t)$ in units of u. Otherwise, when either the next sampling pulse or camera pulse arrives, the value of K(t) is the number of web pulse units since the last sampling or camera pulse.

The measured K(t) values are used as weighting coefficients for the luminance of all pixels of the incoming camera lines $CLD_N$. This will proportionally generate more contribution to the result for camera lines covering a larger width of the web.

When a sampling pulse occurs, this abruptly resets the camera counter. The value reached at this instant is retained in the register, and is exactly the weight of the contribution of the interrupted camera line to the reconstructed line. The next retained value is the contribution of the same camera line to the next reconstructed line.

The coefficients generated by successive coefficient values K(t) are input to one terminal of a multiplier 411. The other input of the multiplier is the line scan data $CLD_N$ from the camera. Thus the multiplier 411 is a vector multiplier that multiplies line scan data by the coefficient and generates weighted products of the scan data $CLD_N$. The weighted products are added in an adder 413 that is a vector adder for all elements of a line. Each time a camera pulse is issued, the output of the adder is added with an accumulated amount in a register 415 that stored a vector of elements. Thus the adder and register form an accumulate and add circuit 416 that builds the reconstructed set of luminances in the register 415, such accumulated sum fed back to the adder for the next camera pulse.

Each time a sampling pulse is issued, the final weighted sum is stored in an output register 417—again a vector register for all line elements. The accumulator register 415 is cleared to prepare the next resampled line.

The sum of all K(t) coefficients used to build a resampled line image data is inherently equal to $S_U$. This means that the output values are the required resampled values multiplied by $S_U$. That is, denoting the resampled output by $RLD_M$, the output 423 of the resampler is $RLD_M S_U$. In one embodiment, $S_U$ is selected to be a power of two, so that rescaling the output of the register 423 is a simple shift circuit not shown in FIG. 4 for simplicity.

As has already been noted, all arithmetic items such as the multiplier 411, adder 413 and associated register 415 are vector devices, operating on whole data lines. This involves internal data buffers as required and as would be appreciated by those of ordinary skill in the art.

One feature of the resampler 217 is that it implements a resampling method that reconstructs resampled line image data sets lines at any sampling pitch—lower or higher than the pitch corresponding to the incoming camera rate.

Figure 5:
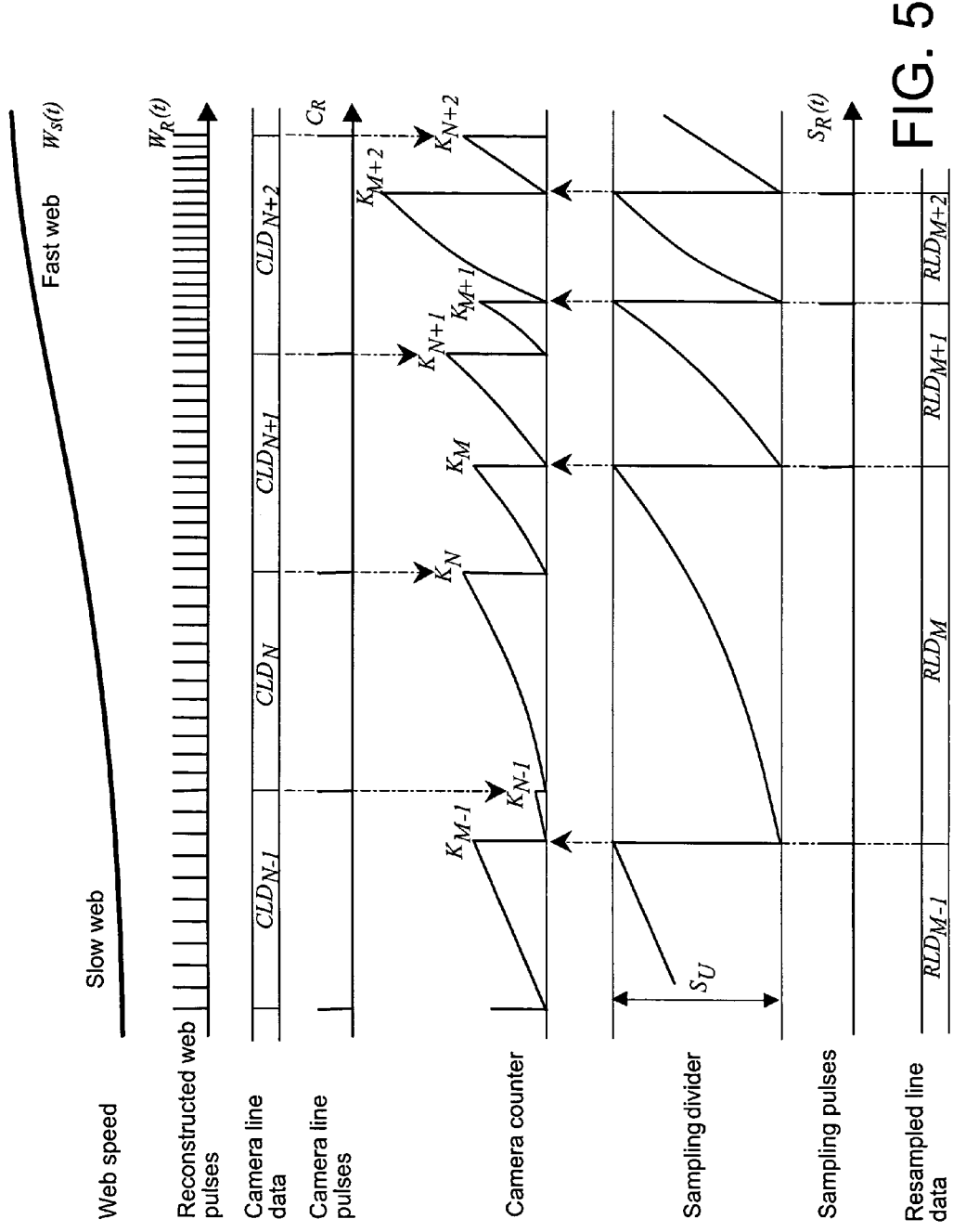
FIG. 5 shows a timing diagram that illustrates operation of the resampler of FIG. 4.

FIG. 5 shows a timing diagram that illustrates operation of the resampler 217. Each accepted imaging data set $CLD_{N-1}$, $CLD_N$, $CLD_{N+1}$, etc., corresponds to imaging for a fixed exposure time while there is relative motion, such each accepted line scan data set has a corresponding distance of relative motion proportional to the relative speed. Note that FIG. 5 shows these data sets as a function of time, hence $CLD_{N-1}$, $CLD_N$, $CLD_{N+1}$, etc., each cover a period equal in time.

The resampling is as if each resampled line scan data was obtained by imaging at a variable exposure time such that each resampled line scan data set has a fixed distance of relative motion during the variable exposure time. Thus, in FIG. 5, the $RLD_M$ has time wider than $RLD_{M+1}$ when the web moves faster, which in turn has a corresponding imaging time wider than $RLD_{M+2}$ when the web moves even faster, and so forth.

For a particular resampled data set, during the fixed distance of relative motion during the variable exposure time, the resampled data set includes a contribution from any accepted imaging data set whose corresponding distance of relative motion overlaps with the fixed distance of relative motion. The contribution is weighted by the fraction of the corresponding distance of relative motion in the overlap. This distance is obtained in monitoring the web speed during said fraction of the corresponding distance.

In the situation shown in FIG. 5, suppose the resampled line data $RLD_{M-1}$ has just been outputted. At this time, the camera input is still $CLD_{N-1}$. The period measuring circuit starts counting. The next trigger for the period counting circuit is for the start of the next line $CLD_N$. The period measuring circuit outputs the next coefficient $K_{N-1}$ so that the product $K_{N-1}CLD_{N-1}$ is accumulated. The next trigger for the period counting circuit is for the start of the next line $CLD_{N+1}$. At this time, the input is $CLD_N$, so that the product $K_N CLD_N$ is accumulated. The next trigger for the period counting circuit is the next resampling time. At this time, the input is $CLD_{N+1}$, so that the product $K_M CLD_{N+1}$ is accumulated. This being the next resampling time, the next resamples line $RLD_M$ is now output. In particular, $$S_U RLD_M = (K_{N-1}CLD_{N-1} + K_N CLD_N + K_M CLD_{N+1}).$$

In the example of FIG. 5, the web now speeds up. The next trigger for the period counting circuit is for the start of the next line $CLD_{N+2}$. At this time, the input is $CLD_{N+1}$, so that the product $K_{N+1}CLD_{N+1}$ is accumulated. Because the web is now moving faster, the next trigger for the period counting circuit is the next resampling time. At this time, the input is $CLD_{N+2}$, so that the product $K_{M+1}CLD_{N+2}$ is accumulated. This being the next resampling time, the next resampled line $RLD_{M+1}$ is now output. In particular, $$S_U RLD_{M+1} = (K_{N+1}CLD_{N+1} + K_{M+1}CLD_{N+2}).$$

The next trigger for the period counting circuit is the next resampling time, the web now moving faster. At this time, the input is still $CLD_{N+2}$, so that the product $K_{M+2}CLD_{N+2}$ is accumulated. This being the next resampling time, the next resamples line $RLD_{M+2}$ is now output. In particular, $$S_U RLD_{M+2} = (K_{M+2}CLD_{N+2}).$$

As can be seen, the resampled line data is a weighted sum of the camera line data that coincides with the camera line data during the resampling period, with the weighting on any camera line data set proportional to the amount of the line data set's period that overlaps with resampled line data set's period, and further proportional to the web speed. Thus, for the sampling period of $RLD_M$, the three camera data sets $CLD_{N-1}$, $CLD_N$, and $CLD_{N+1}$ overlap. Only a fraction of $CLD_{N-1}$ and $CLD_{N+1}$ overlap, so the weighting on these, $K_{N-1}$ and $K_M$, respectively, are in proportion of the overlap and also a function of the web speed, which is now slow, while the whole of $CLD_N$ is weighted (by $K_N$), also in proportion to the slow web speed. Furthermore, for the case of $RLD_{M+2}$, because the web is now moving fast, only $CLD_{N+2}$ overlaps, the weighting $K_{M+2}$ is in proportion to the proportion of $CLD_{N+2}$ that overlaps, and the speed of the web, now fast, such that $K_{M+2}$ is relatively large.

Thus the resampling automatically adjusts for the speed of the web and the desired sampling distance. The sampling pitch (as a distance) can include a plurality of camera line data sets, or a fraction of a single line data set, i.e., both oversampling and undersampling.

Thus, a method and apparatus has been described for using a line scan camera in the fixed exposure mode, while ensuring geometric and dynamic fidelity. The method uses a line scan camera that need not provide for variable exposure control, and indeed typically provides better performance that a controlled exposure camera.

In one version, the camera "free cycles" in that an internal clock in the camera provides the camera rate. In another mode, the camera rate is selected by the user by providing a set of line trigger pulses to the camera.

Because the relative speed between the camera and an imaged object can vary, e.g., in the case of a web, the web speed can vary, when the camera rate and exposure are fixed, the gap (a distance) between successive sampling lines varies. The method and apparatus described herein manipulates the sampled data to produce resampled data such that the gap between successive lines of the resampled data is constant.

While the above-described embodiment uses a weighted sum of the sampled data that overlaps in the resampling period, the invention is not dependent on any particular method of resampling. Alternate embodiments use other resampling methods. One simpler resampling method used in an alternate embodiment is the nearest neighbor method. Each resampled output is determined from the nearest input data set. Yet another method provides more accurate resampling by using more of the input data set.

Figure 6:
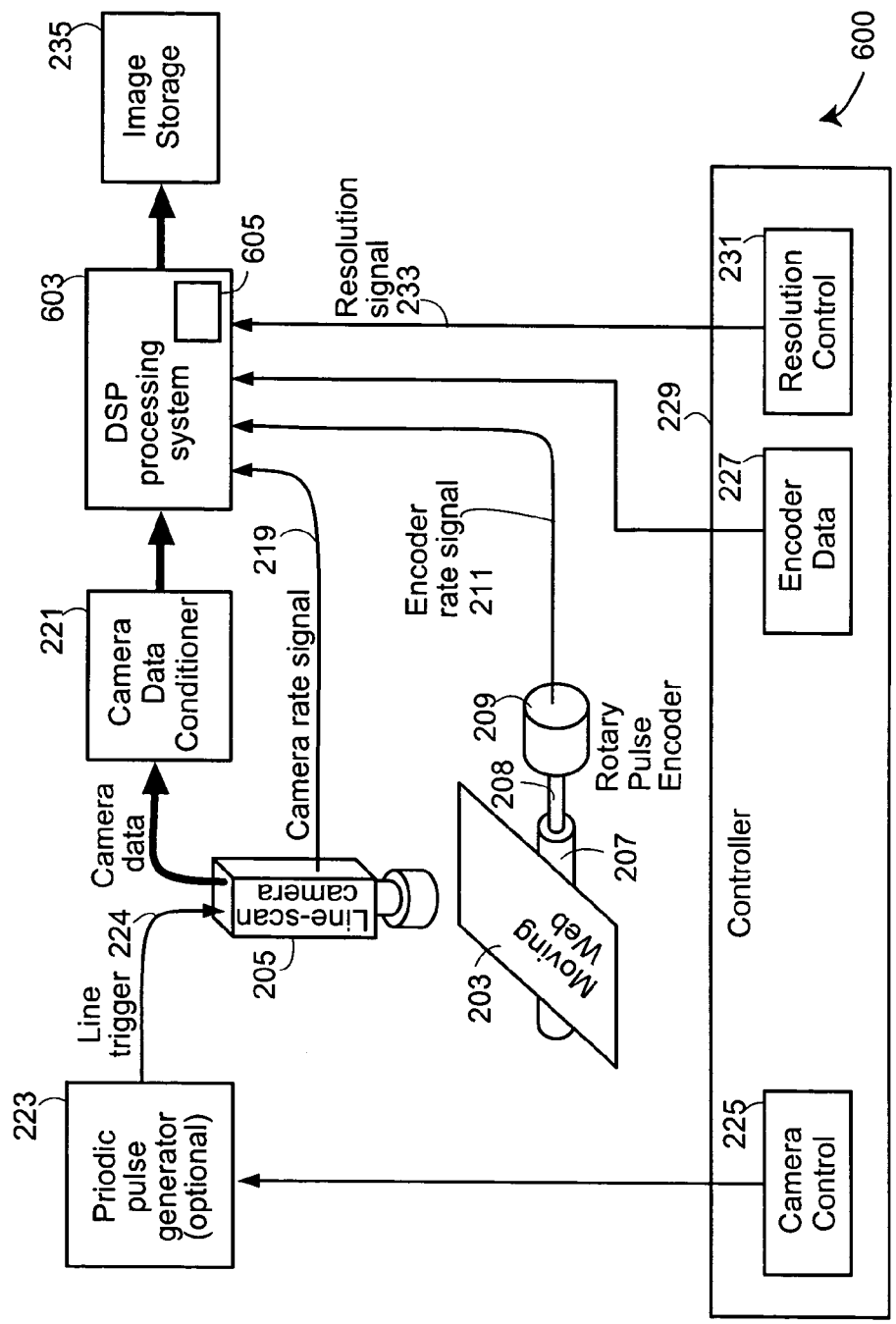
FIG. 6 shows an alternate embodiment that uses a programmable processing system for resampling.

Furthermore, the hardware embodiment described above for various elements, e.g., for the resampler 217 is one possible implementation. The invention does not depend on any one type of implementation. An alternate embodiment uses a programmable processor, e.g., a microprocessor or a DSP device to achieve the resampling. DSP devices include hardware multipliers, and adder-accumulator circuits, and include both memory for data and a memory for instructions that instruct the processor to process data. One alternate embodiment of the system is shown in FIG. 6. The resampler has been replaced by a processing system 603 that includes at least one processor and a memory 605 that includes a set of programming instructions that instruct the DSP system 603 to carry out the steps of resampling. In one embodiment, the processing system is based on a DSP device. Note that the rate converter function is now incorporated in the processing system 603, so that the processing system accepts the encoder rate signal 211 directly.

The processor, e.g., DSP device producing a resampled line image data set which is a weighted sum of the accepted line-scan data set.

Another embodiment uses a vector filter processor for the resampler. The vector filter processor produces a weighted moving average with variable coefficients. The coefficients are such that weighting if proportional to the relative speed such the data imaged when the object is moving relatively slowly is weighted more than when the object is moving relatively fast in relation the camera.

Figure 7:
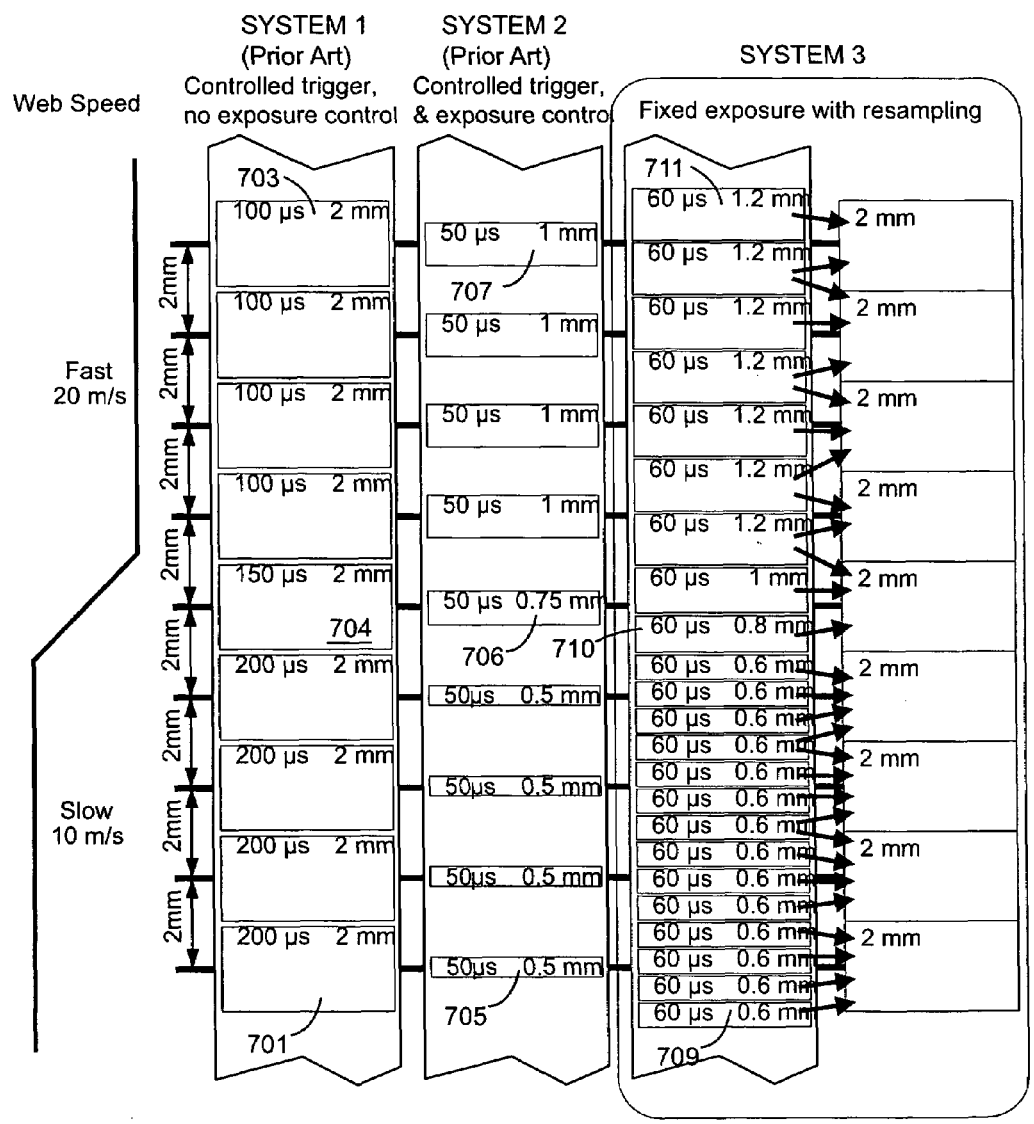
FIG. 7 shows by example a comparison of the operation of a first prior-art system, a second prior-art system and a third system that includes an embodiment of the present invention.

FIG. 7 shows by example a comparison of the operation of a first prior-art system, a second prior-art system and a third system that includes an embodiment of the present invention. The diagram shown, for each system, sample lines whose width (the vertical direction on the page) represents the distance for which the camera shutter is open. The speed of the web is initially slow at 10 m/s (the bottom part of the diagram) and then is fast at 20 m/s (the top part of the drawing) with a transitional region wherein the Web speeds up from the slow to the fast speed.

The first system (leftmost "SYSTEM 1" in FIG. 7) is a prior art, permanent exposure, controlled trigger system that includes a line trigger controlled by an encoder such that a line is imaged every 2 mm. The shutter of the camera is uncontrolled, and remains open between sample times. Thus, the four lines, e.g., line 701 when the web is slow are imaged for 200 μs (2 mm/10 m/s) while the top four samples, e.g., line 703 when the web is fast are imaged for only 100 μs. An intermediate line such as line 712 is imaged for 150 μs. Because the different exposure times for a strip of the same width, the top image lines such as line 703 is underexposed compared to the bottom imaged lines 701.

One prior art method of dealing with the variable exposure is to control the exposure. The second system (middle "SYSTEM 2" in FIG. 7) is a prior art, controlled exposure, controlled trigger system that includes a line trigger controlled by an encoder such that a line is imaged every 2 mm, and an exposure control with the exposure fixed at 50 μs no matter what the speed of the web. This overcomes the uneven exposure of the first system. In this case, when the web is moving slow, e.g., during line 705, the exposure time corresponds to 0.5 mm (50 μs at 10 m/s), while when the web moves fast, e.g., during line 707, the exposure time corresponds to 1 mm. Line 706 is when the web is at an intermediate speed. Note that the fixed exposure time is limited to the time between lines when the web is moving at its fastest possible speed. This speed may not be known in advance, so the exposure may need to be set for less time than may later prove to be possible. In any case, the camera may not be imaging at all times, so that the signal-to-noise ratio may not be all it could be.

The third system (rightmost "SYSTEM 3" in FIG. 7) includes an embodiment of the present invention. The camera runs freely, imaging at a fixed exposure set by a clock, e.g., an internal clock in the camera. In this example camera images every 60 μs and is imaging most of the time, i.e. the camera rate is about 16.667 kHz. As a result, the distance between lines of image data collected by the camera varies in inverse proportion to the Web speed. When the web moves slow, e.g., during line 709, the distance between consecutive lines of image data collected by the camera is 0.6 mm (50 μs at 10 m/s) while when the web moves fast, e.g., during line 711, the distance between consecutive lines of image data is 1.2 mm. Line 710 is when the web is at an intermediate speed. Note that unlike the cases of the first and second system, the distances between lines of data being collected by the camera are unrelated to the desired sample period, in this case 2 mm.

According to an aspect of the invention, the lines of image data collected at the camera rate are combined or resampled to produce image data separated by 2 mm. The exposure will be even. Furthermore, as a result of the camera imaging most of the time, the signal-to-noise ratio will be higher than with the second system. Furthermore, the camera system will be less complicated than that used in the second system that requires a camera that has a variable exposure time.

Thus a method and apparatus has been described for imaging. Some of the features that may be achievable using the method and apparatus described herein include:

- Simplicity of controls and the ability to use a less complicated camera.
- No fixed pattern noise that sometimes occurs with an exposure controlled camera.
- Improved signal to noise ratio since the camera is imaging practically all the time.
- Speed variability.
- No limit on sample size imposed by the maximum camera rate. The resampling may provide a smaller sampling period than the camera would achieve when operating at its maximum rate.

An improved modulation transfer function (MTF) in the direction of relative motion. It is known that variable exposure cameras can degrade such an MTF.

One embodiment of the present invention is implemented as an industrial vision system that incorporates a frame buffer (an image memory).

Note that while the term "line-scan camera" has been used, those in the art will understand that by such a line scan camera is meant any one-dimensional sensor of imaging radiation. The imaging radiation may be monochromatic, or at several bands, e.g., in color. Furthermore, the camera may be one for detecting optical light, infra-red, x-ray, or other forms of radiation.

Note further that the imaging optics has not been shown in the diagrams. Embodiments of the invention may be used with a variety of optics systems, and with a variety of sources of imaging radiation, such as optical radiation, x-ray radiation, and so forth.

Embodiment of the invention can be used with radiation that is reflected off an object, e.g., light reflected off an opaque object, or for transmittive imaging in which light is transmitted via a transparency or other transmittive object.

The above embodiment uses an "encoder" to provide a measure of the relative speed between the line-scan camera and the object being imaged. While one encoder used is an optical encoder that produces a set of pulses of a frequency that is proportional to the relative speed, the term "encoder" means any device that produces a signal that provides a measure of the relative speed between the line-scan camera and the object being imaged by the line-scan camera. The specific system described herein is one where the camera is stationary, the object being imaged moves, and the encoder produces a pulse train whose frequency varies as the relative speed. Such an encoder may be a rotary or linear encoder, or may be a source of signal coupled to the source of pulses that drive a stepper motor.

Alternative embodiments may use an encoder that produces a signal whose amplitude varies as the relative speed, or an analog sinusoidal signal whose frequency varies as the relative speed, or some other source of a signal that provides a measure of the relative speed.

Note that while the system described herein assumes that the line-scan camera produces digital data, i.e., the system accepts line-scan data that is in digital form, alternate embodiments interface directly to a line-scan camera that produces a serial stream of analog pixel data for each line according to a set of read-out pulses provided to the camera.

For such a system, the camera data conditioner generates the required read-out signal for the camera and accept the serial stream of analog data, pixel-by-pixel, from the camera. The camera data conditioner in such a case includes the required analog-to-digital converter (ADC) that converts the analog pixel data to a digital line-scan data set. The result is a buffer of line-scan data.

Another aspect of the invention is a complete frame buffer that includes the image memory for storing one or more frames of image data. Referring to FIG. 2, one embodiment of the frame buffer includes a camera data conditioner 221, a controller 229, a rate converter 213, a resampler 217, and an image memory 235. The frame buffer embodiment also includes an interface 233 to a computer system 235, e.g., to at least one bus of a computer system, such that the frame buffer can easily be incorporated into a computer based industrial vision system. The interface 233 provides for inputting parameters such as the desired sampling rate and other parameters, and also for moving the video to the computer's memory.

The data conditioner 221 may be simply an input terminal to accept the line-scan data sets form the camera at a camera rate, or may do some conditioning such as scaling. The data conditioner also includes any interface circuitry needed for the camera. For example, the camera may produce the pixel data as a serial data stream. The data conditioner would in such a case include the necessary mechanism to input the serial data stream, each stream one line's worth of data, to form the accepted line-scan data set.

One embodiment of the frame buffer is designed to interface to a digital camera. In such a case, the data conditioner 221 accepts line-scan data that is in digital form.

Alternate embodiments interface directly to a line-scan camera that produces a serial stream of analog pixel data for each line according to a set of read-out pulses provided to the camera. For such a system, the camera data conditioner 221 generates the required read-out signal for the camera and accepts the serial stream of analog data, pixel-by-pixel, from the camera. The camera data conditioner in such a case includes any required sample and hold and analog-to-digital converter that convert the analog pixel data to a digital line-scan data set. There may be one (for monochrome) or at least one (for color or other multi-spectral data) analog-to-digital converters and sample and hold circuits for producing the accepted line-scan data set. The result is a buffer of line-scan data.

Yet another embodiment can interface to a variety of cameras including an analog camera and a digital camera. In such an embodiment, analog-to-digital conversion circuit(s) are included that can be controllably switched in for an analog camera.

In one embodiment, the exposure time of the camera while accepting the line-scan data sets is fixed, but the exposure time for independent line-scan data sets is settable.

By "faithfully exposed data" we mean data sets having the correct relative luminance from sample to sample. As one but not the only example, faithfully exposed data results if both the relative speed and the exposure time are constant.

By the "spatial resampling period" we mean the sampling pitch that is the desired distance in the relative motion direction between resampled line image data sets. Each line image data set has a corresponding spatial resampling period, and in the embodiment described herein, all the spatial resampling periods are equal in size.

By the "resampling time" we mean the time period corresponding to each resampled line image data set, i.e., to each spatial resampling period. The resampling time varies according to the relative speed, and thus, may overlap in the time domain with a different number of accepted line-scan data sets and with the proportion of any accepted line-scan data set in the overlap.

Note also that while the invention has been described above in terms of a web imaging system in which a web or a belt carrying an object is moved while a line-scan camera is stationary, with the direction of each line perpendicular to the direction of motion of the web, embodiments of the invention are also applicable to other mechanisms for producing relative motion and imaging lines with a line scan detector, such as when the object to be imaged is stationary and the line scan camera moves relative to the object kept stationary.

One embodiment of each of the methods described herein is in the form of a computer program that executes on a processing system, e.g., a one or more processors that are part of industrial imaging system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:

accepting line-scan data sets at a camera rate from a line-scan camera, each line-scan data set being of an object imaged for a fixed exposure time and moving at a relative speed in relation to the line-scan camera;

accepting a measure of the relative speed between the line-scan camera and the object being imaged by the line-scan camera; and resampling the line-scan data sets to produce resampled line image data sets at a desired sampling distance, the resampling being a function of the camera rate, the measure of relative speed and the desired sampling distance, such that the resampling adjusts for variations in relative speed to produce faithfully exposed data, wherein there is a resampling time corresponding to each resampled line image data set, and wherein the resampling produces a resampled line image data set that is a weighted sum of the accepted line-scan data sets that are partially or completely accepted during the resampling time corresponding to the resampled line image data set, the weightings a function of the relative speed such that a first proportion of a first accepted line-scan data set is weighted less when the relative speed is slower than a second proportion of a second accepted line-scan data set corresponding to when the relative speed is faster, wherein for a particular resampled line image data set, the weighting of any particular accepted line-scan data set is further a function of the proportion of overlap in the relative motion direction of the accepted with the spatial resampling period of the particular resampled line image data set, wherein each accepted line-scan data set corresponds to imaging for a fixed exposure time while there is relative motion, such that each accepted line-scan data set has a corresponding distance of relative motion proportional to the relative speed, wherein the resampling is as if each resampled line image data was obtained by imaging at a variable exposure time, such that each resampled line image data set has a fixed distance of relative motion during the variable exposure time, and wherein for a particular resampled line image data set, during the fixed distance of relative motion during the variable exposure time, the resampled line image data set includes a contribution from any accepted line-scan data set whose corresponding distance of relative motion overlaps with the fixed distance of relative motion, said contribution weighted by the fraction of the corresponding distance of relative motion in the overlap.

2. An apparatus comprising:

a data conditioner to accept line-scan data sets at a camera rate from a line-scan camera, each line-scan data set being of an object imaged for a fixed exposure time and moving at a relative speed in relation to the line-scan camera;

an encoder terminal to accept a measure of the relative speed between the line-scan camera and the object being imaged by the line-scan camera; and a resampler coupled to the data conditioner and to the encoder terminal, the resampler to resample accepted line-scan data sets to produce sets of line image data at a desired sampling distance, the resampling a function of the camera rate, the measure of relative speed and the desired sampling distance, such that the resampling adjusts for variations in relative speed to produce faithfully exposed data wherein there is a resampling time corresponding to each resampled line image data set, and wherein the resampler produces a resampled line image data set that is a weighted sum of the accepted line-scan data sets that are partially or completely accepted during the resampling time corresponding to the resampled line image data set, the weightings a function of the relative speed such that a first proportion of a first accepted line-scan data set is weighted less when the relative speed is slower than a second proportion of a second accepted line-scan data set corresponding to when the relative speed is faster, wherein each accepted line-scan data set corresponds to imaging for a fixed exposure time while there is relative motion, such that each accepted line-scan data set has a corresponding distance of relative motion proportional to the relative speed, wherein the resampling is as if each resampled line image data was set obtained by imaging at a variable exposure time, such that each resampled line image data set has a fixed distance of relative motion during the variable exposure time, and wherein for a particular resampled line image data set, during the fixed distance of relative motion during the variable exposure time, the resampled line image data set includes a contribution from any accepted line-scan data set whose corresponding distance of relative motion overlaps with the fixed distance of relative motion, said contribution weighted by the fraction of the corresponding distance of relative motion in the overlap.

3. An apparatus comprising:
  a data conditioner to accept line-scan data sets at a camera rate from a line-scan camera, each line-scan data set being of an object imaged for a fixed exposure time and moving at a relative speed in relation to the line-scan camera;
  a rate converter to accept a measure of the relative speed between the line-scan camera and the object being imaged by the line-scan camera and produce a web-rate signal related to the accepted measure of relative speed by a scaling factor; and
  a resampler coupled to the data conditioner and to the rate converter, the resampler to resample accepted line-scan data sets to produce sets of resampled line image data at a desired sampling distance, the resampling a function of the camera rate, the measure of relative speed and the desired sampling distance,
  an image store coupled to the resampler to accept the sets of line image data; and
  an interface between a computer system and the rate converter, the resampler, and image store to provide for transferring the resampled line image data sets to the computer system, and for setting the scaling factor and desired sampling distance, such that the resampling adjusts for variations in relative speed to produce faithfully exposed data, wherein each accepted line-scan data set corresponds to imaging for a fixed exposure time while there is relative motion, such that each accepted line-scan data set has a corresponding distance of relative motion proportional to the relative speed, wherein the resampling is as if each resampled line image data was set obtained by imaging at a variable exposure time, such that each resampled line image data set has a fixed distance of relative motion during the variable exposure time, and wherein for a particular resampled line image data set, during the fixed distance of relative motion during the variable exposure time, the resampled line image data set includes a contribution from any accepted line-scan data set whose corresponding distance of relative motion overlaps with the fixed distance of relative motion, said contribution weighted by the fraction of the corresponding distance of relative motion in the overlap.

4. A computer-readable medium with machine readable and executable instructions encoded thereon, the instructions when executed by one or more processors of a processing system causing carrying out a method comprising:
  accepting line-scan data sets at a camera rate from a line-scan camera, each line-scan data set being of an object imaged for a fixed exposure time and moving at a relative speed in relation to the line-scan camera;
  accepting a measure of the relative speed between the line-scan camera and the object being imaged by the line-scan camera; and
  resampling the line-scan data sets to produce resampled line image data sets at a desired sampling distance, the resampling a function of the camera rate, the measure of relative speed and the desired sampling distance, such that the resampling adjusts for variations in relative speed to produce faithfully exposed data wherein there is a resampling time corresponding to each resampled line image data set, and wherein the resampling produces a resampled line image data set that is a weighted sum of the accepted line-scan data sets that are partially or completely accepted during the resampling time corresponding to the resampled line image data set, the weightings a function of the relative speed such that a first proportion of a first accepted line-scan data set is weighted less when the relative speed is slower than a second proportion of a second accepted line-scan data set corresponding to when the relative speed is faster, wherein each accepted line-scan data set corresponds to imaging for a fixed exposure time while there is relative motion, such that each accepted line-scan data set has a corresponding distance of relative motion proportional to the relative speed, wherein the resampling is as if each resampled line image data was set obtained by imaging at a variable exposure time, such that each resampled line image data set has a fixed distance of relative motion during the variable exposure time, and wherein for a particular resampled line image data set, during the fixed distance of relative motion during the variable exposure time, the resampled line image data set includes a contribution from any accepted line-scan data set whose corresponding distance of relative motion overlaps with the fixed distance of relative motion, said contribution weighted by the fraction of the corresponding distance of relative motion in the overlap.

* * * * *

UNITED STATES PATENT AND TRADEMARK OFFICE
CERTIFICATE OF CORRECTION

PATENT NO. : 7,425,982 B2 Page 1 of 1
APPLICATION NO. : 10/712428
DATED : September 16, 2008
INVENTOR(S) : Joskin et al.

It is certified that error appears in the above-identified patent and that said Letters Patent is hereby corrected as shown below:

Title page, Item (73) Assignee, kindly change "(BG)" to --(BE)--

Signed and Sealed this

Fourteenth Day of April, 2009

JOHN DOLL
*Acting Director of the United States Patent and Trademark Office*